(12) United States Patent
Hickman

(10) Patent No.: US 7,448,027 B2
(45) Date of Patent: Nov. 4, 2008

(54) EXTENDIBLE INSTRUCTION SYSTEM

(75) Inventor: Andrew J. Hickman, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 665 days.

(21) Appl. No.: 10/109,746

(22) Filed: Mar. 29, 2002

(65) Prior Publication Data

US 2004/0015845 A1 Jan. 22, 2004

(30) Foreign Application Priority Data

Apr. 20, 2001 (GB) ............................... 0109722.9

(51) Int. Cl.
*G06F 9/45* (2006.01)
(52) U.S. Cl. .................... 717/137; 717/102; 717/104; 717/115; 717/121; 715/236; 715/249
(58) Field of Classification Search ............... 717/104, 717/105, 109, 113–114, 102, 115, 121, 137; 707/3; 715/236, 249
See application file for complete search history.

(56) References Cited

U.S. PATENT DOCUMENTS

| | | | |
|---|---|---|---|
| 6,083,276 A | 7/2000 | Davidson et al. ............... 717/1 |
| 6,338,082 B1 * | 1/2002 | Schneider .................... 709/203 |
| 6,466,971 B1 * | 10/2002 | Humpleman et al. ........ 709/220 |
| 6,608,634 B1 * | 8/2003 | Sherrard et al. .............. 715/730 |
| 6,636,853 B1 * | 10/2003 | Stephens, Jr. ................. 707/10 |
| 6,643,650 B1 * | 11/2003 | Slaughter et al. .............. 707/10 |
| 2002/0049749 A1 * | 4/2002 | Helgeson et al. ............... 707/3 |
| 2002/0049790 A1 * | 4/2002 | Ricker et al. ................. 707/513 |

OTHER PUBLICATIONS

"Metadata for Record Keeping and Online Resource Discovery" Adrian Cummingham (http://www.acs.org.au/act/events/2000acs2/Auckland/index.htm).
"Metadata: Foundation, Potential and Applications" K. Hodgson (http://www.slis.ualberta.ca/538/khodgson/metadata.htm), 1998.

* cited by examiner

*Primary Examiner*—Tuan Q. Dam
*Assistant Examiner*—Thuy Dao

(57) ABSTRACT

An instruction system for issuing instructions from a first computer system (50-90) for execution by a second computer system (10, 20, 40) is described. The instruction system comprises instructions of a first type having an effect on the second computer system which is determinable by the first and second computer systems, and instructions of a second type, the effect of which is not determinable by the first computer system. The instructions of the second type each include a descriptor for aiding a user to determine the effect of the respective instruction at the first computer system.

6 Claims, 6 Drawing Sheets

```
1   <?xml version="1.0" encoding="ISO-8859-1"?>
2   <!DOCTYPE ServiceDescription SYSTEM "myTV.dtd">
3   <ServiceDescription>
4      <ServiceGetMetadata version="3">
5         <Name>Barry Norman</Name>
6         <Description>
7         Allow Barry Norman to give you his reviews and ratings so
8         that you can choose only the best films each week.</Description>
9         <URL>www.barry-norman.com/cgi-bin/myTVservices.cgi</URL>
10        <ExtraField name="actors" language="en" description="Stars"/>
11        <ExtraField name="director" language="en" description="Director"
12               queryType="substring"/>
13        <ExtraField name="rating" language="en" description="Rating (out of 5)"
14               queryType="greaterthan_or_range"/>
15     </ServiceGetMetadata>
16  </ServiceDescription>
```

```
1   <?xml version="1.0" encoding="ISO-8859-1"?>
2   <ServiceDescription xmlns:xsd="http://www.w3.org/2000/10/XMLSchema">
3      <ServiceGetMetadata version="3">
4         <Name>Barry Norman</Name>
5         <Description>
6           Allow Barry Norman to give you his reviews and ratings so
7           that you can choose only the best films each week.
8         </Description>
9         <URL>www.barry-norman.com/cgi-bin/myTVservices.cgi</URL>
10        <QueryMethod type="withNegation"/>
11        <FixedField name="Title" comparison="caseInsensitive"/>
12        <FixedField name="Genre" comparison="exact"/>
13        <FixedField name="Synopsis" comparison="substring"/>
14        <ExtraField name="actors" language="en" description="Stars"
15               parameterType="xsd:string"/>
16        <ExtraField name="director" language="en"
17               description="Director" queryType="substring"
18               parameterType="xsd:string"/>
19        <ExtraField name="rating" language="en" description="Rating
20               (out of 5)" queryType="greaterthan_or_range"
21               parameterType="xsd:positiveInteger"/>
22        <ExtraField name="date" language="en" description="Release date"
23               queryType="greaterthan_or_range" parameterType="xsd:date"/>
24     </ServiceGetMetadata>
25  </ServiceDescription>
```

FIG.3

```
<ProgramInformation programId="crid://barry-norman.com/id_12345"
      version="1" mediaType="TV">
   <Title language="en" type="original">Rainman</Title>
   <Synopsis language="en">
   When Charlie Babbit's father leaves a fortune to his autistic brother,
   Charlie decides that it's time to meet him.
   </Synopsis>
   <Genre type="myTV">Movies:Drama</Genre>
   <SpokenLanguage>en-US</SpokenLanguage>
   <Subtitle type="None"/>
   <ExtraField name="actors" language="en" description="Stars">
     Tom Cruise, Dustin Hoffman</ExtraField>
   <ExtraField name="director" language="en" description="Director"> Barry
     Levison</ExtraField>
   <ExtraField name="rating" language="en" description="Rating (out of 5)">5
   </ExtraField>
   <ExtraField name="review" language="en" description="Barry says">
     One of the highlights of 1988 - strongly recommended.</ExtraField>
 </ProgramInformation>
```

FIG.5

Rainman *Drama*

When Charlie Babbit's father leaves a fortune to his autistic brother, Charlie decides that its time to meet him.

Stars: Tom Cruise, Dustin Hoffman

Director: Barry Levison

Rating (out of 5): 5

Barry says: One of the highlights of 1988 - strongly recommended

FIG.6

EXTENDIBLE INSTRUCTION SYSTEM

The present invention relates to an extendible instruction system that allows a computer system to use extended instructions without knowledge of their semantics or effect.

Communication between computer-based systems is commonly in the form of instructions. In order for one computer system to communicate with another, it is necessary that the first computer system understands the instruction set and semantics of the second computer system so that it can formulate instructions the second computer system can process. In order to achieve this, shared programming languages and standardized communication protocols have been developed to enforce a common link between instruction sets.

One type of instruction set that is being used with increasing popularity is referred to as metadata. Metadata, data about data, is normally a series of field names and corresponding values that describe attributes of a user, a computer system or an accompanying data item. Typically, a mark up language such as the Extensible Markup Language (XML) is used. Unfortunately, it is not possible to make any assumptions about the structure and representations of metadata. Although it might consist of field names and values marked up with XML, the same metadata can and often will be represented completely differently. Therefore, a device must be pre-programmed with the necessary semantics to be able to use particular metadata.

Although standards are being formed for metadata, as with all standards, many parties have developed their own version of the standard or even different competing standards to solve the same problem. For example, metadata is increasingly being used to describe multimedia content for supply to users. In addition to a digital television broadcast, a set-top-box may receive a metadata file that includes fields describing the author, title, genre, duration and other attributes of the television broadcast. Such data is then used to generate a program guide of other information on the broadcast.

Whilst the use of metadata is proving to be both useful and powerful, the existence of competing standards, such as two entertainment companies defining different metadata fields for carrying the same information about the same type of content, and so called "compatible" standards, such as where a party adds fields to an agreed metadata standard in order to support new functionality assuming systems not understanding the new fields will just ignore them, causes problems.

In particular, a computer system can only take the necessary action instructed by an instruction within the metadata or provide the user with information corresponding to metadata fields if the device has been programmed to be able to interpret and process the instruction or field. Where metadata is received by a device containing fields that its programming does not understand the device will not be able to use those fields. In the best case, where the metadata is in XML, the device will at least be stable due to XML ensuring syntactic correctness. In the worse case, the device may fail or crash when trying to process the metadata file.

For example, a computer system may have been programmed to understand a field "lead actor" associated with a database on films. However, if the database then included the field "Star", the computer system would not know that these fields are in fact the same. Furthermore, given a value for "Star", the computer system would not know what to do with it.

This situation becomes worse as new services become available and enhancements to additional data or services are added. In such cases, new instructions may be possible and new metadata fields may be generated by such services. However, the receiving device is unaware of the new instructions and metadata fields and is therefore unable to interpret the fields or to use the new instruction types.

According to a first aspect of the present invention, there is provided an instruction system for issuing instructions from a first computer system for execution by a second computer system, the instruction system comprising instructions of a first type having an effect on the second computer system which is determinable by the first and second computer systems, and instructions of a second type, the effect of which is not determinable by the first computer system, wherein the instructions of the second type each include a descriptor for aiding a user to determine the effect of the respective instruction at the first computer system.

The present invention seeks to provide a mechanism by which agreed standards can be extended and the extensions can be used at a device without the device having specific knowledge of the extensions, their effect or their semantics. By allowing third parties to define their own metadata fields as extensions, such as those relating to information they have some specialized ability to acquire or generate, services offered to the local device can be enhanced without updates being necessary to the device.

In the present invention, two types of metadata fields are used to form an instruction set. The first type are fixed metadata fields which all devices must support and understand the semantics of. These are typically embedded within the programming of the device. The second type of metadata fields are additional fields which can be added after implementation of the instruction set where it is often difficult or impossible to update the programming of the devices. Such extra fields allow the data provided by the instruction set, or the functionality of a service that can be instructed by instructions within the instruction set, to be extended without any corresponding updates in a user device being necessary. In particular, the extra metadata fields include information to be provided about the fields to a user. Typically, the extra metadata fields are listed in a service description file that a device can access to determine additional functionality.

The first computer system may be arranged to generate a user interface for display in dependence on the instructions of the first and/or second types, wherein instructions of the second type are represented in the user interface as their respective descriptor and an input field.

The first computer system may be arranged to generate a communication for transmission to the second computer system for execution, the generation being in dependence on the instructions of the first type and on inputs to the user interface, wherein inputs to input fields corresponding to instructions of the second type are inserted in the communication without being changed.

The instructions of the second type may comprise an identifier identifying the instruction as being of the second type and the descriptor.

The instructions of the second type may further comprise a number of sub-fields. These may define the language that the description of the instruction is given in and an implementation of the query for use by the instructions of the first type. The second computer system may operate a database of information, execution of the instructions comprising execution of a query on the database of information, wherein results of the query are communicated to the first device.

The second computer system may comprise a World Wide Web server hosting a World Wide Web site on the Internet, the first computer system being arranged to communicate with the World Wide Web site for issuing instructions.

The first computer system may comprise a selected one of: a mobile telephone, a personal digital assistant, a personal computer, an intelligent household appliance or a decoder for a digital television system.

According to another aspect of the present invention, there is provided a computer system arranged to generate communications including instructions that the computer system has no knowledge of their semantics or effect, the computer system being configured to accept instructions of a first type having a determinable effect and instructions of a second type having an undeterminable effect, wherein the instructions of the second type each include a descriptor for aiding a user to determine the effect of the respective instruction, the computer system being arranged to display the descriptor of each instruction of the second type with an associated input field and to accept inputs to the input fields, wherein a communication comprises the inputs to the input fields and data generated in dependence on the instructions of the first type.

According to another aspect of the present invention, there is provided a method of generating communications at a computer system for issuance to another computer system comprising the steps of:

accessing a set of instructions at the computer system, the set of instructions including instructions of a first type having a determinable effect by the computer system and instructions of a second type having an undeterminable effect by the computer system, the instructions of the second type each including a descriptor for aiding a user to determine the effect of the respective instruction;

generating a user interface including the descriptors of the instructions of the second type and an input field associated with each descriptor;

accepting inputs to the input fields; and, generating a communication from the accepted inputs in dependence on the instructions of the first type.

Examples of the present invention will now be described in detail, by way of illustration only, and with reference to the accompanying drawings, in which:

FIG. 3 is an example metadata file illustrating the extension of an instruction set according to another aspect of the present invention;

FIG. 5 is an example metadata file received in response to a query made using the instruction set of FIG. 2; and, FIG. 6 is another example metadata file illustrating the extension of an instruction set according to another aspect of the present invention.

Figure 1:
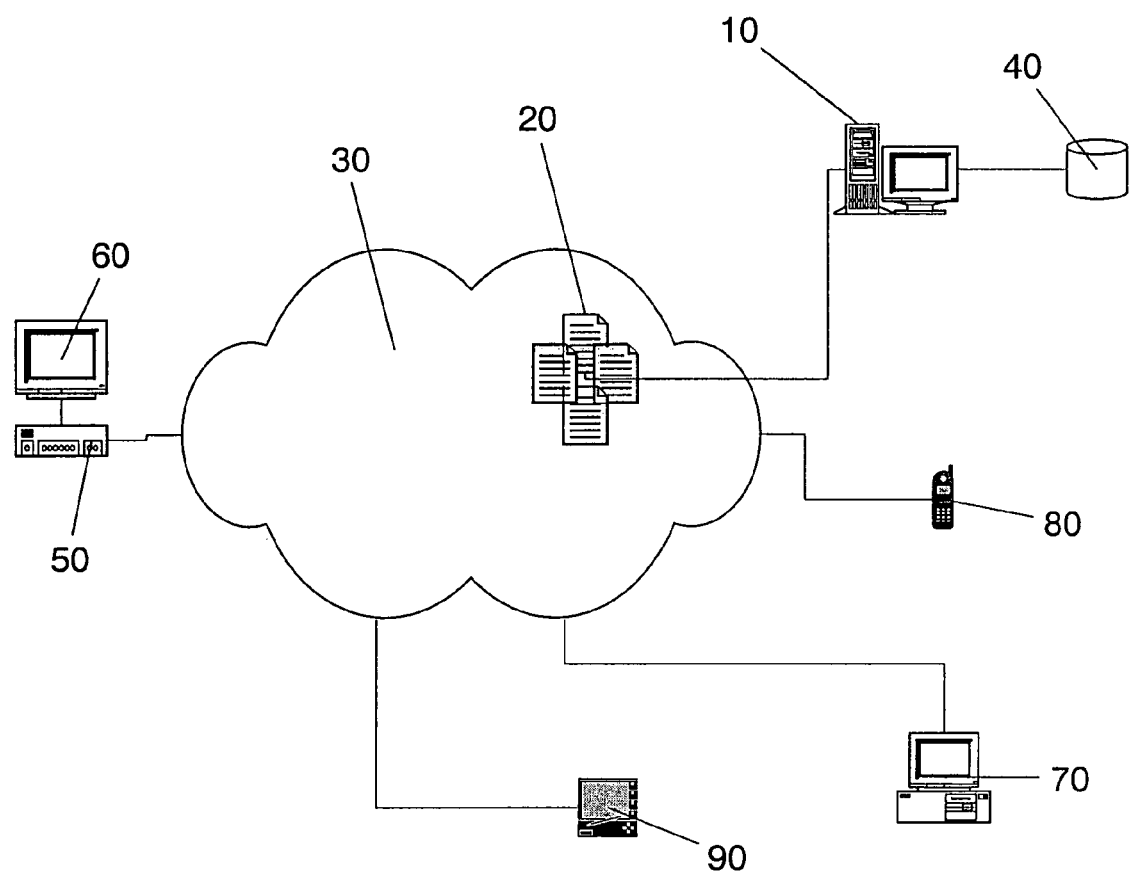
FIG. 1 is a schematic diagram of a computer system suitable for implementing the present invention.

A computer server 10 hosts a World Wide Web site 20 on the Internet 30. The World Wide Web site 20 offers access to a database 40 of information that can be searched using the World Wide Web site 20 over the Internet 30 via remote user terminals. The remote user terminals may be set-top-boxes 50 connected to television sets 60, PC's 70, mobile telephones 80, personal data assistants 90 or other computer based devices.

The user terminals have a standard instruction set in a memory. Instructions in the standard instruction set are of a first type and have semantics known to the user terminals. The user terminals also either include a copy of a service description file associated with the Web site 20 in the form of a metadata file in a memory or are able to obtain an appropriate service description file. In order to access the database 40 and query it, a user terminal accesses its copy of the service description file and the standard instruction set and generates a user interface for presentation to the user allowing a query or request to be input.

Once the query or request has been input by the user via the user interface on the user terminal, it is formatted appropriately for submission to the Web site 20 by the user terminal and then transmitted to the Web site 20 over the Internet 30.

Upon receipt, the server 10 searches the database 40 using the query and returns a result to the user terminal over the Internet 30 in the form of a metadata file. For example, the results may simply be an indication of success of a request or may be information from the database that matches the query.

In a specific example, the remote user terminal may be a so-called intelligent fridge (not shown) or other household device, in which case the database 40 may contain information on recipes, food products or be associated with a vendor from which the fridge can order food.

It will be appreciated that such client-server arrangements are common in the art. However, if the database 40 is updated to include extensions in the form of new fields that can be queried or new requests are acceptable by the server 10, it is currently necessary for the user terminal to be updated to take account of the changes. The update to the user terminal is required because it is necessary for it to be able to generate a user interface that accommodates the changes. Furthermore, the user terminal must know what to do with the new fields or new requests if the user submits a query or request using them.

Figure 2:
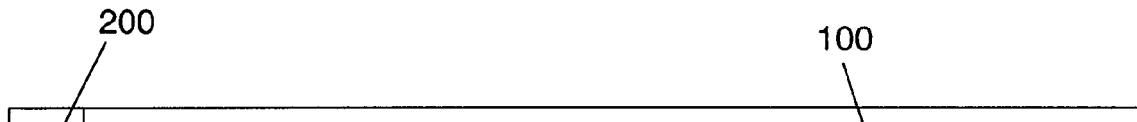
FIG. 2 is an example metadata file illustrating the extension of an instruction set according to one aspect of the present invention.

FIG. 2 is an example service description metadata file illustrating the extension of an instruction set according to one aspect of the present invention. The associated Web site 20 allows a database 40 of films to be searched by a user terminal. The line numbers 200 shown next to the metadata 100 of the service description file are for illustration purposes only and are not normally included in metadata files.

In the present invention, extensions to existing service description files are in the form of extra fields. The extensions are explicitly identified in the file as extra fields (in the example of FIG. 2 by using the tag <ExtraField>) and include a descriptor field. Examples of the extra fields can be seen in lines 11, 12 and 14 of FIG. 2.

The remaining fields describe the service provided on lines 5 to 8 and the destination to which a user terminal should submit queries on line 9.

FIG. 3 is an example metadata file illustrating the extension of an instruction set according to another aspect of the present invention. In addition to the extra fields, the service description file may specify the instructions of the first type from the user terminal's standard instruction set that are acceptable. These are listed in lines 11 to 13 with the tag <Fixedfield>. In this manner, a service or database need not support all of the fields from the standard instruction set and can dictate those that are acceptable. When a field becomes out of date or no longer applicable, the standard instruction set does not need to be updated but the service description file can identify those fields that are acceptable. Semantics associated with instructions of the first type are known to the device, the service definition file merely serves to indicate whether they can be used.

Figure 4:
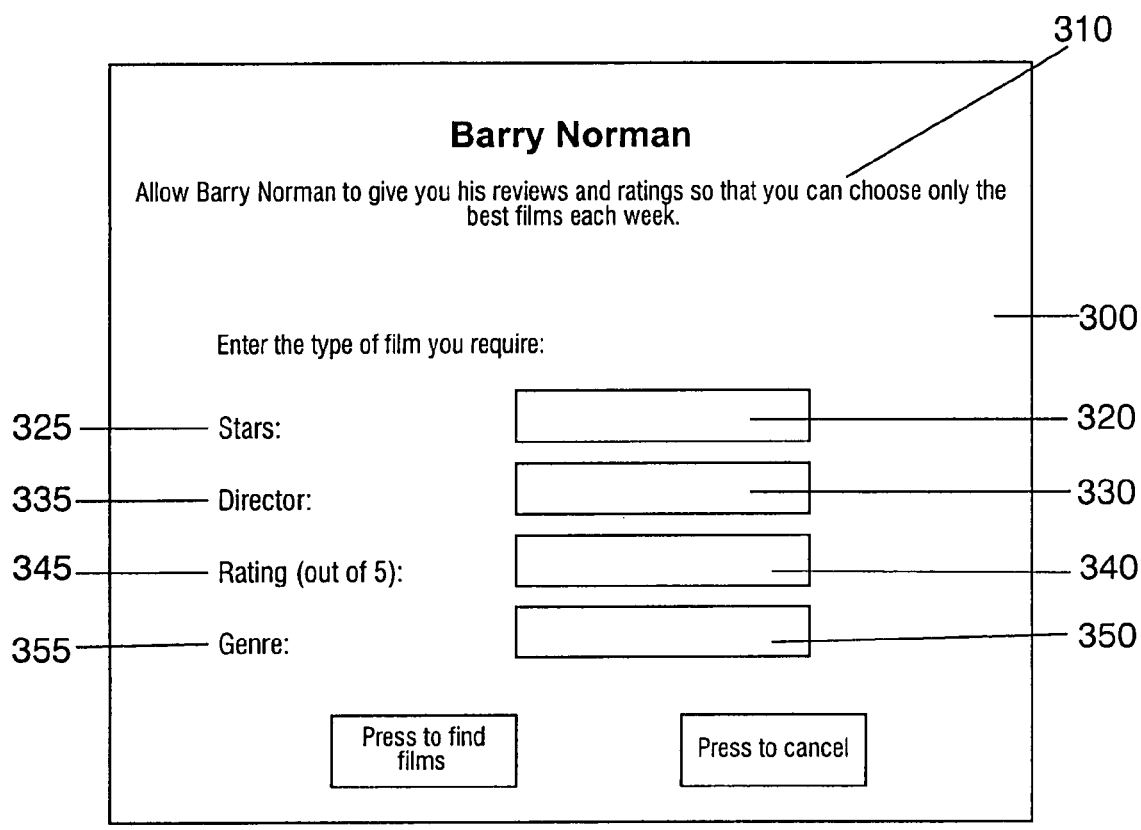
FIG. 4 is an example user interface generated in dependence on the metadata file using the instruction set of FIG. 2.

Upon accessing the file, the user terminal uses the extra fields and the standard instruction set to generate a user interface such as is shown in FIG. 4. The description of the service is displayed to the user in area 310 of the interface 300 and an input field 320, 330, 340 and 350 for each extra field is generated using the description field associated with each extra field to provide a descriptor 325, 335, 345, 355 describing the input field.

When the user submits a query from the user interface 300, the user terminal formats the query for submission to the destination specified in the service description file. For example, if the input for the Stars field 320 was "Tom Cruise", the Rating (out of 5) field 330 was "5" and the genre field 350 was "Drama", the formatted query would be:

<http://www.barry_norman.com/cgi-bin/myTVservices.cgi?actors=Tom+Cruise&rating=5&Genre=drama>

FIG. 5 is an example metadata file received in response to a query made using the instruction set of FIG. 2. In this example, data associated with the extra fields in the response to the query are returned in a metadata file of the same format as those from the service description file. The response is used to generate a screen for display to the user. The extra fields are displayed to the user along side their associated description fields in the same manner as in the user interface of FIG. 4.

A screen shot of the data displayed to the user is illustrated in FIG. 6.

In order for extensions to the instruction set to be usable without a user terminal having existing knowledge and programming of the extensions, the user terminal must be able to identify extensions of the instruction set and generate a generic user interface with descriptors from the extensions that are specifically written to describing the effect of the extensions to the user. The user terminal need not understand the effect or relevance of the extensions, it must merely be able to relay a provided descriptor to the user. The descriptor should provide enough information for the user to appreciate what the extension is and what it is used for. In this manner, a user can instruct the user terminal to incorporate or use the extension in a request or query, the user terminal relaying the extension to a system understanding the extension without further interaction.

Metadata for content and operations that is not thought of at the time of implementing the instruction set can be added and used by user terminals without understanding of their effect or semantics.

In the example of FIG. 2, a language and a query type sub field is included with a number of the extensions. The user terminal uses the language sub-field to select extensions to be used. In the present example, the language code is ISO639 compliant so can be unambiguously interpreted by the user terminal or device. If a terminal or device has a language setting, it would be programmed to only display extra fields in the language of that setting. Some sites may choose to provide their metadata in more than one language and this sub-field allows the user terminal or device to select the most appropriate language. The query type sub field to specify how the extension field can be queried. Another type of sub-field could explicitly say the variable type expected—Date, integer, 4 letter string, etc. This would enable the user terminal or device to verify the data the user has entered before submitting the query, still without requiring an understanding of the extra field's semantics.

Whilst the present invention has been described with reference to remote devices accessing Web based databases over the internet, it could equally be implemented over broadband, digital television networks or any other communication network.

The present invention may be used for user profiling. For example, a user device may deduce that extension fields with the same values are used repeatedly. Such extension fields and values could then be used for obtaining automatic recommendations or recordal of a user profile despite the fact that the user terminal has no understanding of the semantics of the metadata. The displaying of the extra field and its use in profiling is possible. However, use for IP queries is not relevant to some other types of network.

The invention claimed is:

1. An instruction system for issuing instructions from a first computer system for execution by a second computer system, the instruction system comprising:
    the first computer system;
    an instruction set issued from the first computer system and including:
        instructions of a first type including fixed metadata fields having an effect on the second computer system which is determinable by the first and second computer systems, and
        instructions of a second type including extra metadata fields, the effect of the extra metadata fields which is not determinable by the first computer system,
    the instructions of the first type being different than the instructions of the second type, the instruction set issued from the first computer system thus containing instructions of the first type and instructions of the second type,
    wherein the instructions of the second type each comprise
        (i) an extension of instructions beyond those of the first type in the instruction set that are explicitly identified as extra metadata fields in a service description metadata file accessible to the first computer system, and (ii) a descriptor operatively associated with each extra metadata field, wherein the descriptor is configured for providing information for aiding a user of the first computer system to determine the effect of and/or to utilize the respective extension of instructions at the first computer system without requiring the first computer system to have an understanding of semantics of the extra metadata fields of the extension of instructions, further wherein the descriptor of each extra metadata field is included in or part of the instruction set issued from the first computer system for execution by the second computer system, and still further wherein the extra metadata fields allow (a) data provided by the instruction set, or (b) the functionality of a service that can be instructed by instructions within the instruction set, to be extended to the first computer system without any corresponding updates in the first computer system being necessary, the instructions of the second type still further comprise:
    (iii) an extra metadata field identifier identifying (a) the instruction as being of the second type and (b) the descriptor, the identifier being different than the descriptor and being included in or part of the instruction set, and
    (iv) a number of sub-fields, the sub-fields (a) being different than the descriptor and (b) being included in or part of the instruction set, wherein the sub-fields are selected from the set of:
        (b(i)) language of the instruction,
        (b(ii)) a definition of the queries acceptable for the instruction, and
        (b(iii)) an explicitly stated variable type expected for enabling the first computer to verify user entered data before submitting a query to the second computer.

2. An instruction system according to claim 1, wherein the first computer system is arranged to generate a user interface for display in dependence on the instructions of the first and/or second types, wherein instructions of the second type are represented in the user interface as their respective descriptor and an input field.

3. An instruction system according to claim 2, wherein the first computer system is arranged to generate a communication for transmission to the second computer system for execution, the generation being in dependence on the instructions of the first type and on inputs to the user interface, wherein inputs to input fields corresponding to instructions of the second type are inserted in the communication without being changed.

4. An instruction system according to claim 1, wherein the second computer system operates a database of information, execution of the instructions comprising execution of a query on the database of information, wherein results of the query are communicated to the first computer system.

5. An instruction system according to claim 4, wherein the second computer system comprises a World Wide Web server hosting a World Wide Web site on the Internet, the first computer system being arranged to communicate with the World Wide Web site for issuing instructions.

6. An instruction system according to claim 1, wherein the first computer system comprises a selected one of: a mobile telephone, a personal digital assistant, a personal computer, a digital video recorder, an intelligent household appliance or a decoder for a digital television system.

* * * * *